(12) United States Patent
Matsubara

(10) Patent No.: US 7,349,780 B2
(45) Date of Patent: Mar. 25, 2008

(54) STEERING ANGULAR VELOCITY COMPUTING DEVICE AND METHOD

(75) Inventor: Katsunori Matsubara, Toyonaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 360 days.

(21) Appl. No.: 11/042,149

(22) Filed: Jan. 26, 2005

(65) Prior Publication Data

US 2005/0171666 A1 Aug. 4, 2005

(30) Foreign Application Priority Data

Jan. 29, 2004 (JP) ............................ 2004-021070

(51) Int. Cl.
*A01B 69/00* (2006.01)
*B62D 6/00* (2006.01)

(52) U.S. Cl. ........................ 701/41; 701/42; 701/43; 180/6.44; 702/145

(58) Field of Classification Search .................. 701/41
See application file for complete search history.

(56) References Cited

U.S. PATENT DOCUMENTS

2003/0069675 A1* 4/2003 Kifuku et al. ................ 701/41

FOREIGN PATENT DOCUMENTS

| EP | 1 225 419 A2 | 7/2002 |
| GB | 2 030 943 A | 4/1980 |
| GB | 2 939 943 A | 4/1980 |
| JP | 2000-85609 | 3/2000 |

\* cited by examiner

*Primary Examiner*—Brian J. Broadhead
(74) *Attorney, Agent, or Firm*—Steptoe & Johnson

(57) ABSTRACT

A steering angular velocity computing device detects a change in a steering angle, measures a required time from a time when the steering angle changed until a time when the steering angle next changed, and computes, after the detector has detected a change in the steering angle, the steering angular velocity by dividing an amount of change in the steering angle by the required time corresponding to the amount of change and outputs it. When the steering angular velocity is being reduced, the steering angular velocity computing unit outputs the steering angular velocity during a first extended output period longer than the required period. Thus, the steering angular velocity is outputted with a high accuracy when the steering angular velocity is being reduced.

5 Claims, 5 Drawing Sheets

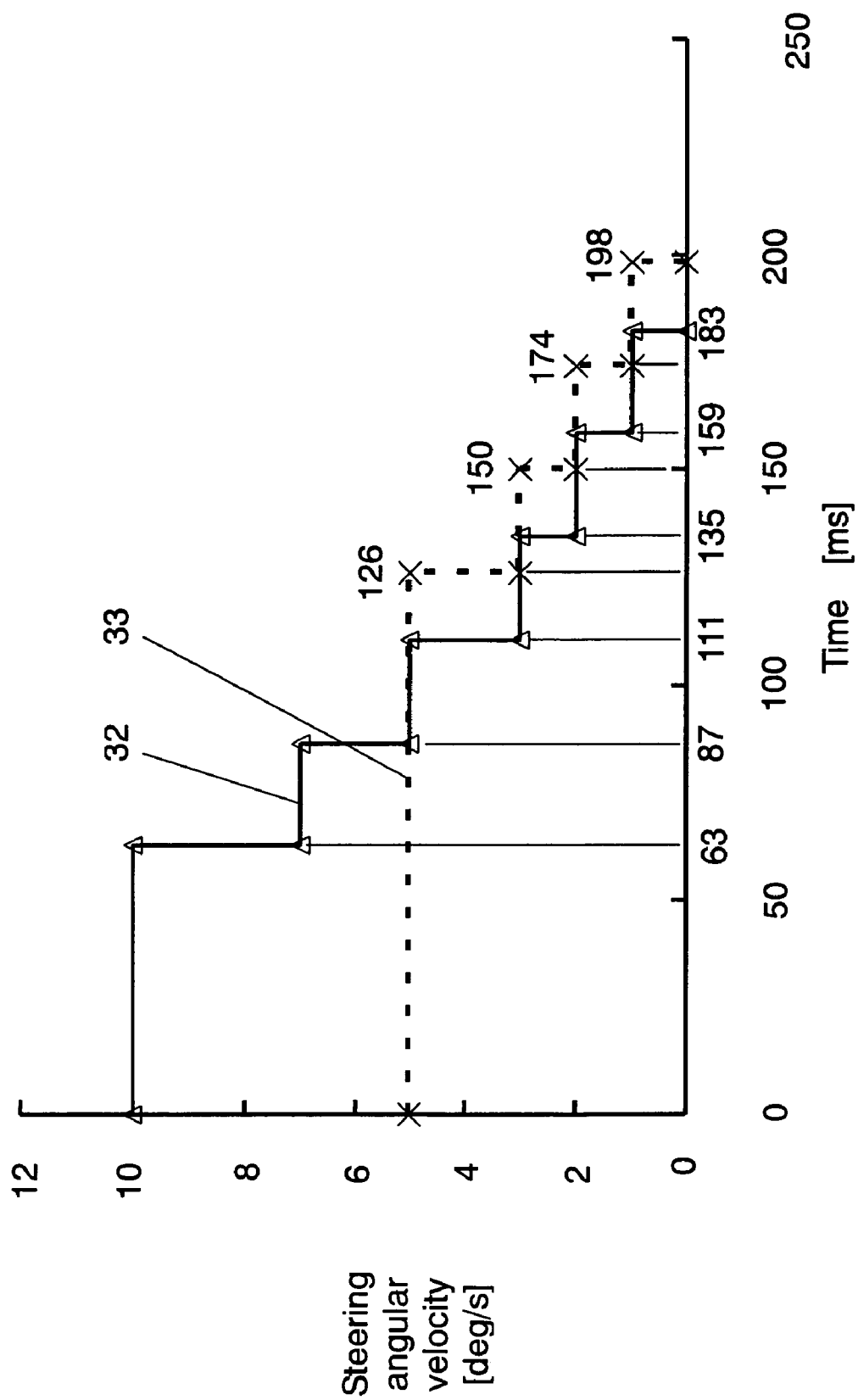

STEERING ANGULAR VELOCITY COMPUTING DEVICE AND METHOD

BACKGROUND OF THE INVENTION

1. Field of the Invention

The present invention relates to a steering angular velocity computing device and method for computing steering angular velocity to be used in body control systems of automobiles or vessels.

2. Background Art

As a method for computing steering angular velocity as used in body control systems of automobiles or vessels, a method of moving averages has heretofore been known in which steering angular velocity is computed by the amount of change of the steering angle during a predetermined period of time. Also known is a steering angular velocity computing method in which steering angular velocity is computed by dividing the amount of change of the steering angle during an interval between the moment at which steering angle made a change and the moment at which the steering angle next changed by the interval and maintaining the steering angular velocity during that interval.

These conventional methods of computing steering angular velocity are disclosed in Japanese Laid-Open Patent Application No. 2000-85609, for example.

SUMMARY OF THE INVENTION

A steering angular velocity computing device of the present invention has a steering angle detector, a timer and a steering angular velocity computing unit. The steering angle detector detects a change in a steering angle and the timer measures a required time from a time at which the steering angle made a change until a time at which the steering angle next changed. The steering angular velocity computing unit computes, after the detector has detected a change in the steering angle, the steering angular velocity, by dividing an amount of change in the steering angle by the required time corresponding to the amount of change and produces it as an output. When the steering angular velocity is being reduced, the steering angular velocity computing unit produces a steering angular velocity output for a first extended output period longer than the required time. With this structure, the steering angular velocity is outputted with high accuracy when the steering angular velocity is being reduced.

BRIEF DESCRIPTION OF THE DRAWINGS

FIG. 5 is a diagram to illustrate an example of steering angular velocity when the steering angular velocity computing device shown in FIG. 1 is in a state of steering angular velocity standstill.

DETAILED DESCRIPTION OF THE INVENTION

Figure 1:
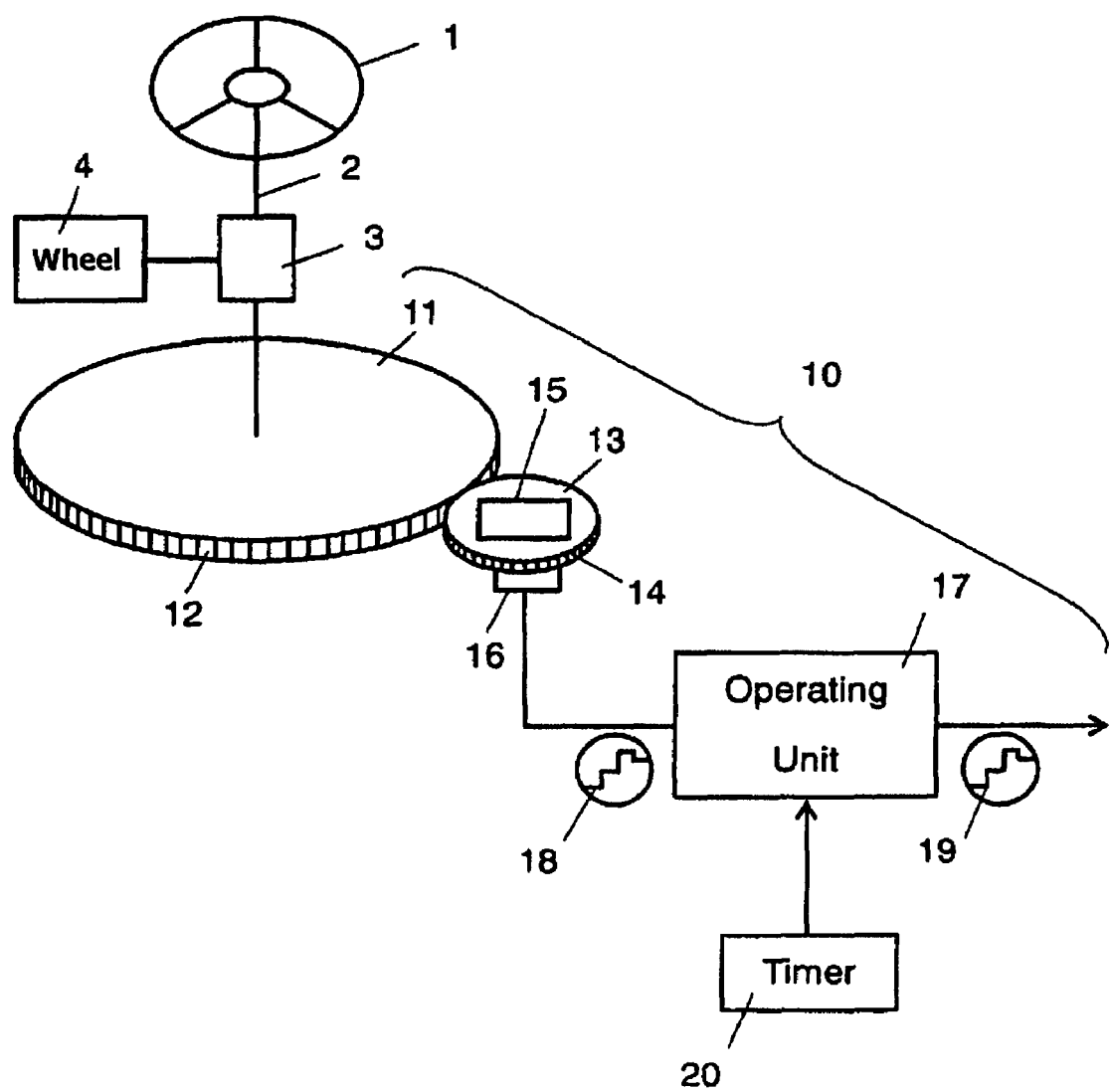
FIG. 1 is a schematic representation of a steering angular velocity computing device in a preferred embodiment of the present invention.

FIG. 1 is a schematic representation of a steering angular velocity computing device in a preferred embodiment of the present invention.

In FIG. 1, steering wheel 1 is operated by a driver of an automobile (not shown). Steering wheel 1 is coupled to steering mechanism 3 and first rotating body 11 (hereinafter referred to as "body 11") provided on steering angular velocity computing device 10 (hereinafter referred to as "device 10") through steering shaft 2. Steering mechanism 3 is coupled to wheel 4 of the automobile and wheel 4 is steered by a rotation transmitted by steering wheel 1. Body 11 has first teeth 12 (hereinafter referred to as "teeth 12") on the outer periphery. Teeth 12 engage second teeth 14 (hereinafter referred to as "teeth 14") provided on the outer periphery of second rotating body 13 (hereinafter referred to as "body 13"). Magnet 15 is incorporated in the central part of body 13. So, body 13 and magnet 15 rotate together. Accordingly, magnet 15 rotates at a velocity determined by the ratio of the numbers of teeth of teeth 12 to teeth 14.

Magnetic steering angle detector 16 (hereinafter referred to as "detector 16") is provided beneath magnet 15 and opposite to magnet 15. A magnetic steering angle sensor such as an anisotropic magnetic resistance element (AMR), for example, can be employed as detector 16. Detector 16 detects a rotating state of rotating body 13 in association with a change in the steering angle and outputs a stepwise steering angle signal 18 (hereinafter referred to as "signal 18"). Furthermore, signal 18 is inputted to operating unit 17 composed of a microcomputer and the like. So, operating unit 17 computes angle of rotation and outputs steering angular velocity signal 19 (hereinafter referred to as "signal 19"). Timer 20 for timing sends information on the measured time to operating unit 17. Also, timer 20 starts timing from zero each time the measured time is reset to zero.

Now, a description of the action of device 10 having the above structure will be given in the following.

In FIG. 1, when body 11 is rotated by operating steering wheel 1, body 13 is rotated by engagement of teeth 12 and teeth 14. Assuming the number of teeth of teeth 12 and the number of teeth of teeth 14 to be C and D, respectively, the rotating velocity ratio of body 13 to body 11 is C to D. That is, body 13 makes C/D rotations while body 11 makes one rotation. By a proper selection of number of gear teeth C and D, body 13 is rotated faster than body 11. Accordingly, detecting resolution of detector 16 can be enhanced.

Detector 16 is disposed at a position opposed to magnet 15. Accordingly, when body 13 is rotated, the direction of magnetic force that penetrates detector 16 changes and detector 16 detects a change in the steering angle. Detector 16 outputs the detected change of the steering angle in the form of stepwise signal 18. In other words, a change in the steering angle corresponds to a change in signal 18. Timer 20 measures the time required from a time at signal 18 first changed to a time at signal 18 next changed. Signal 18 and the required time are input to operating unit 17, computed, and signal 19 is outputted from operating unit 17.

Next, a description will be given on the method of computing steering angular velocity.

Figure 2:
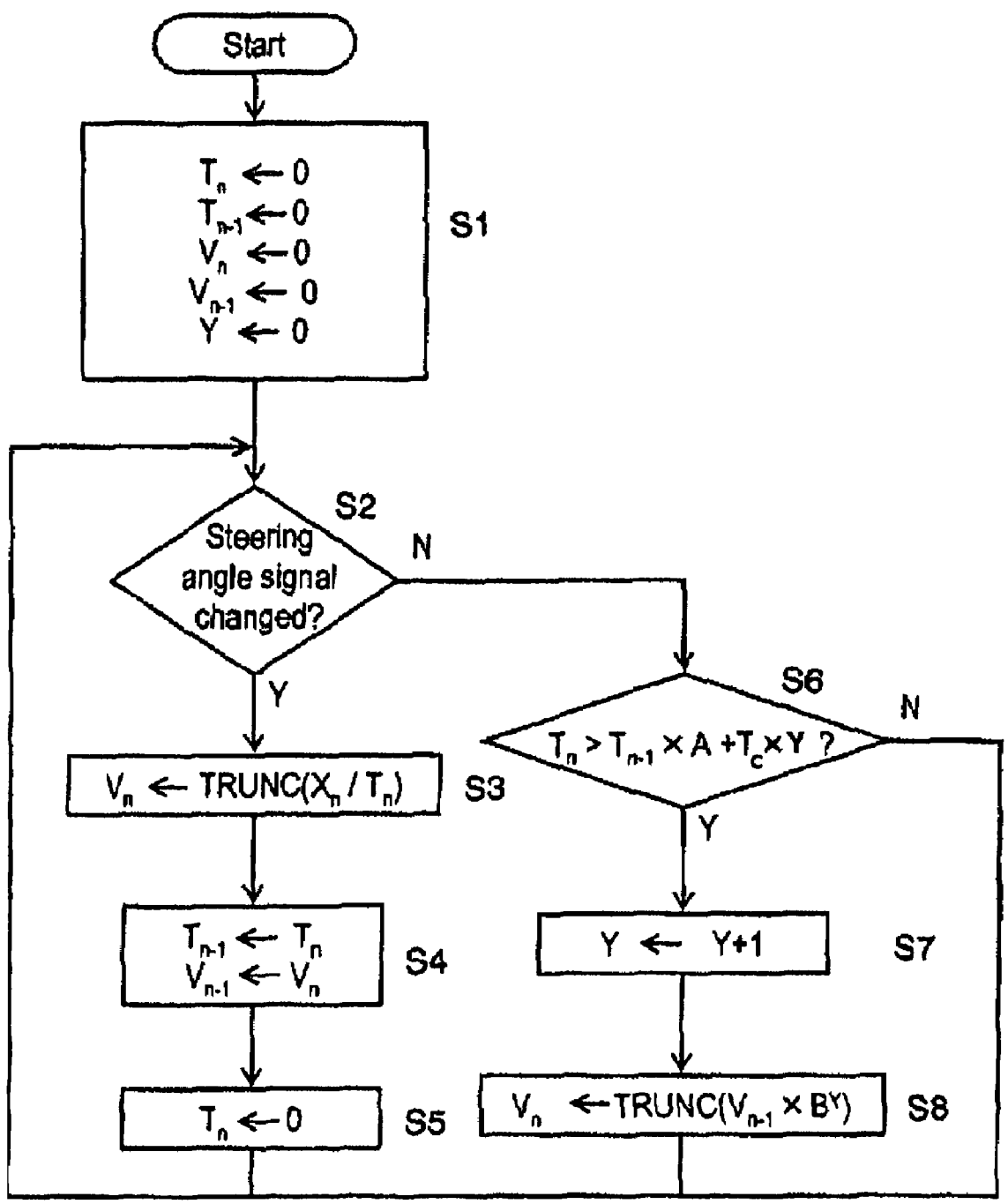
FIG. 2 is a flow chart of a steering angular velocity computing method as used in the steering angular velocity computing device shown in FIG. 1.

FIG. 2 is a flow chart showing the steering angular velocity computing method as employed in steering angular velocity computing device 10 shown in FIG. 1.

In FIG. 2, when an ignition key (not shown) of an automobile is actuated, device 10 performs initial operation (step S1). During the initial operation, the measured time $T_n$ (hereinafter referred to as "time $T_n$") of timer 20 and reference time $T_{n-1}$ are reset to zero. In addition, detected values of steering angular velocity $V_n$ (hereinafter referred to as "velocity $V_n$"), reference velocity $V_{n-1}$ and the number of making extension Y are reset to zero. Timer 20 starts timing after time $T_n$ has been reset to zero.

Subsequently, device 10 determines whether or not signal 18 has changed (step S2). If signal 18 has changed, the amount of change $X_n$ in the steering angle is divided by time $T_n$ and velocity $V_n=\text{TRUNC}(X_n/T_n)$ is computed (S3). Here, the "TRUNC" function is defined as a function in which a decimal is cut off. That is, velocity $V_n$ is always an integer. Also, time $T_n$ here represents the required time corresponding to the amount of change $X_n$ in the steering angle. Velocity $V_n$ that is a computed result is outputted from operating unit 17 as signal 19.

Next, time $T_n$ is substituted for reference time $T_{n-1}$ that is required time for change of immediately preceding signal 18. At the same time, velocity $V_n$ is substituted for reference velocity $V_{n-1}$ that is immediately preceding steering angular velocity (step S4). Subsequently, time $T_n$ is reset to zero, timing by timer 20 resumes, and the step returns to step S2. And, timer 20 measures the required time $T_{n+1}$ until occurrence of next change in the steering angle, and next steering angular velocity $V_{n+1}=\text{TRUNC}(X_{n+1}/T_{n+1})$ is computed by dividing the amount of change of the steering angle $X_{n+1}$ in the next change of the steering angle by next required time $T_{n+1}$. Step 2 and subsequent steps are repeated in sequence in this way.

On the other hand, when there is no change detected in signal 18 in step S2, determination is made as to whether time T.sub.n exceeds extended output period (hereinafter referred to as "period") T.sub.e=T.sub.e1+T.sub.e2=T.sub.n−1.times.A+T.sub.c.times.Y (step 6). Here, period T.sub.e is a sum of first extended output period (hereinafter referred to as "period") T.sub.e1=T.sub.n−1.times.A obtained by multiplying reference time T.sub.n−1 by time coefficient A and second extended output period (hereinafter referred to as "period") T.sub.e2=T.sub.c.times.Y obtained by multiplying constant extended period T.sub.c by the number of making extension Y.

And, if time $T_n$ exceeds period $T_e$, the number of making extension Y in which time $T_n$ exceeded period $T_e$ is counted up (step 7). Subsequently, velocity $V_n$ is substituted with reduced steering angular velocity $V_{n-1} \times B^Y$ obtained by multiplying reference velocity $V_{n-1}$ by the y-th power of velocity coefficient B and dropping a decimal, and is outputted as output 19 (step S8). Here, velocity $V_n$ is always an integer. That is, each time the number of making extension Y increases, the rate of reduction of the reduced steering angular velocity decreases exponentially. Subsequently, the step proceeds to step S2, and step S2 and subsequent steps are repeated again.

Also, in step S6, if time $T_n$ does not exceed period $T_e$, the step returns to step S2 again, and step S2 and subsequent steps are repeated. As output signal 19, the value of velocity $V_n$ is outputted.

That is, if no change in the steering angle is detected even when reference time $T_{n-1}$ has elapsed, the time during which velocity $V_n$ is outputted is extended for extended output period $T_e$. Extended output period $T_e$ is first extended for first extended output period $T_{e1}$. Furthermore, if no change in the steering angle is yet detected, the time during which velocity $V_n$ is outputted is extended for second extended output period $T_{e2}$ obtained by multiplying constant period $T_c$ by the number of making extension Y. Also, each time extended output period $T_e$ is extended, velocity $V_n$ is reduced. Accordingly, the output of velocity $V_n$ is gradually reduced even when it is not possible to detect, in the event no change in the steering angle is detected, whether steering angle change has come to a complete standstill or a steering angle change is undergoing at an extremely low velocity. And, finally, the output of velocity $V_n$ smoothly comes to a steering angular velocity standstill.

Figure 3:
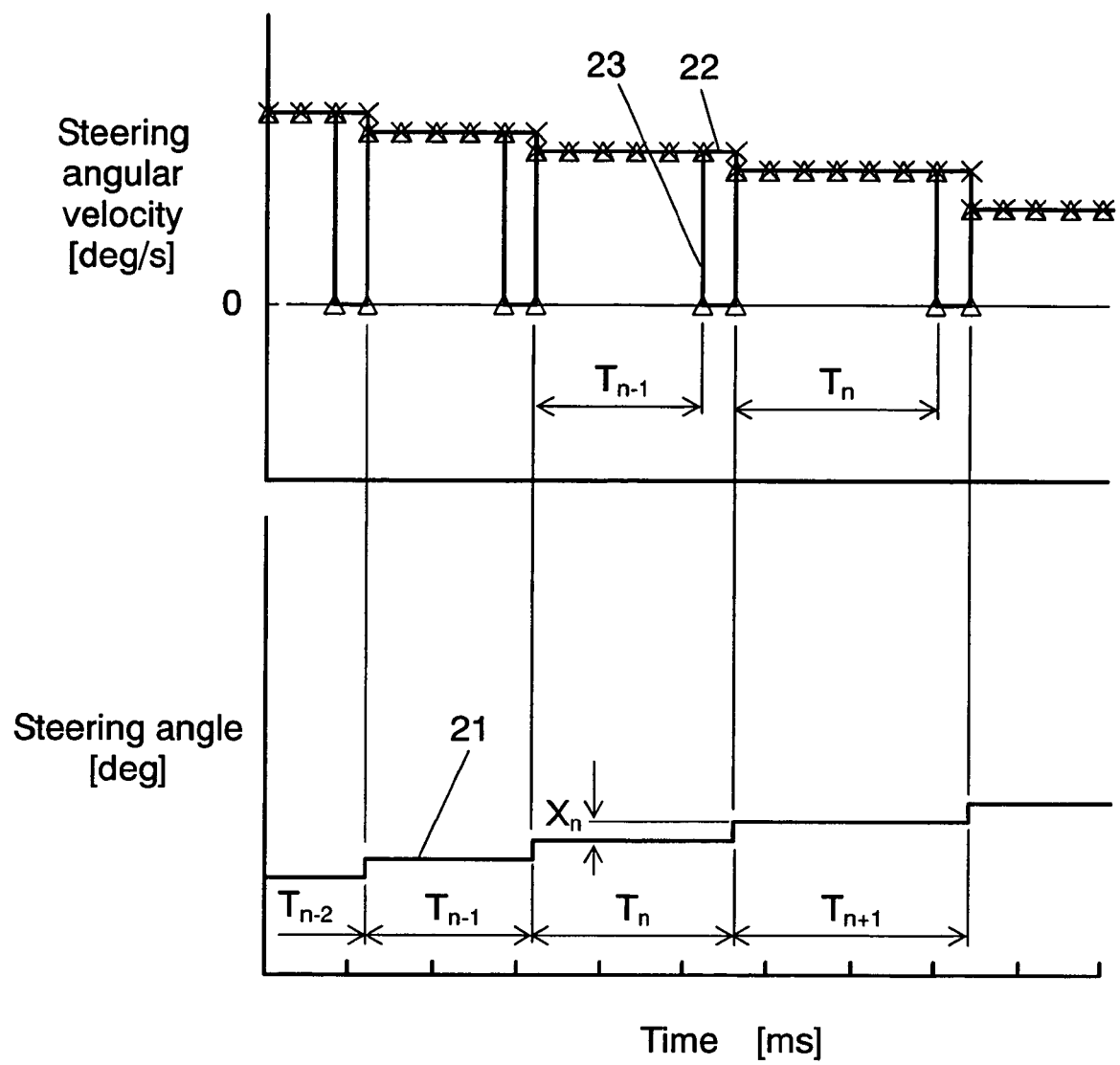
FIG. 3 is a diagram to illustrate a change in the steering angular velocity during deceleration of the steering angular velocity computing device shown in FIG. 1.

FIG. 3 is a diagram to show the behavior of signal 18 and signal 19 while the steering angular velocity is being reduced in the steering angular velocity computing device shown in FIG. 1.

In FIG. 3, steering angle 21 represents the behavior of signal 18 when steering velocity is being reduced showing a gradual increase in the required time $T(T_{n-2}<T_{n-1}<T_n<T_{n+1})$. Steering angular velocity 22 (hereinafter referred to as "velocity 22") represents the behavior of signal 19 when the steering angular velocity is computed by extending the time until computation of next steering angular velocity to period $T_{e1}=T_{n-1} \times A$ by multiplying by time coefficient A=5/4=1.25. Also, steering angular velocity 23 (hereinafter referred to as "velocity 23") represents the behavior of signal 19 when steering angular velocity is computed after elapse of reference time $T_{n-1}$ without extending the time until computation of the next steering angular velocity.

In FIG. 3, no change in the steering angle is yet detected after reference time $T_{n-1}$ has passed. However, as reference time $T_{n-1}$ has been extended to period $T_{e1}=T_{n-1} \times A$, continuous velocity 22 is computed and outputted based on a change in the steering angle as detected during the extended period. Owing to this, as steering angular velocity $V_n$ will not become apparently zero, it will not come to a standstill. Accordingly, continuous velocity 22 is outputted and velocity 22 that follows actual change in the steering angular velocity is outputted.

On the other hand, time coefficient A is not applied to velocity 23, and no change in the steering angle is detected during reference time $T_{n-1}$. As a result, a part is produced during reduction of the steering angular velocity in which velocity 23 is zero as shown in FIG. 3. That is, velocity 23 partially shows a state of steering angular velocity standstill (0 deg/s) thus outputting a discontinuous output.

Also, since the measured steering angular velocity is not changing, it is not possible to detect whether steering angle change has come to a complete standstill or a steering angle change is occurring at an extremely low velocity. As a result, it is not possible to know actual steering angular velocity with high accuracy.

By extending the apparent length of measuring time by means of time coefficient A as set forth above, no standstill (0 deg/s) of the steering angular velocity occurs during reduction of the steering angular velocity, and continuous velocity 22 can be outputted. Furthermore, it is possible to output accurate velocity 22 that follows actual steering angular velocity.

Figure 4:
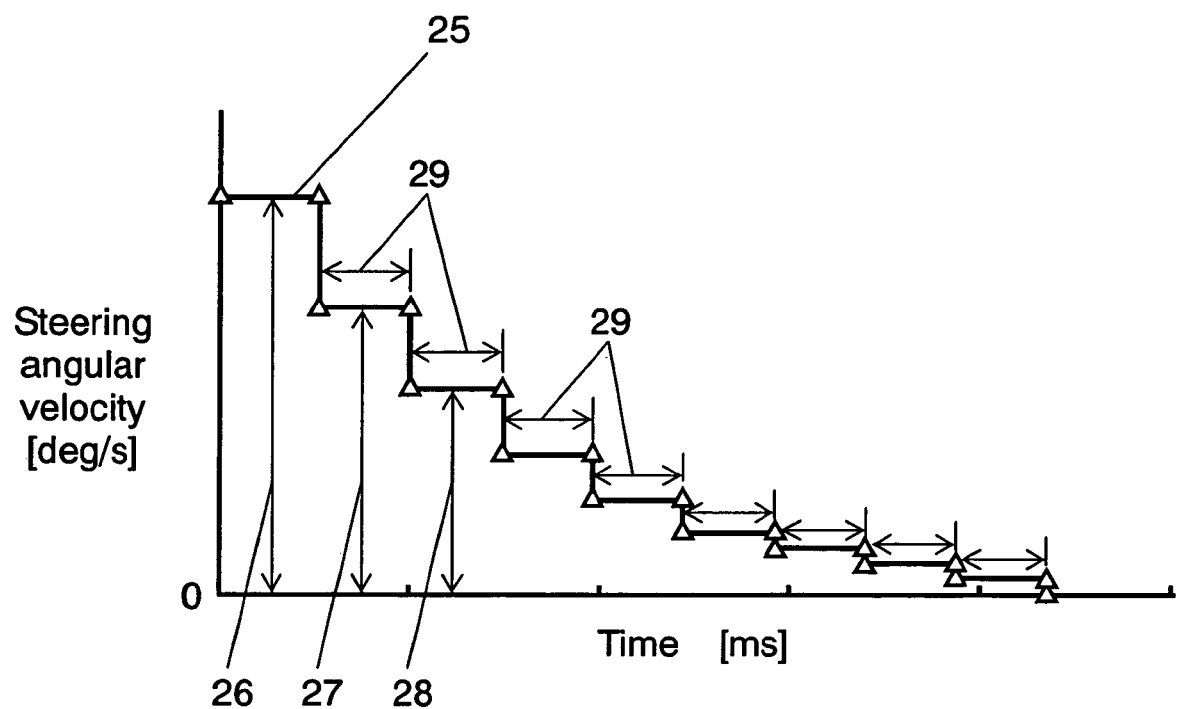
FIG. 4 is a diagram to illustrate steering angular velocity when the steering angular velocity computing device shown in FIG. 1 is in a state of steering angular velocity standstill.

On the other hand, FIG. 4 is a diagram showing an example of a steering angular velocity output when steering angular velocity came to a standstill and no change occurred in signal 18 after a prior change in steering angle signal 18.

Steering angular velocity 25 (hereinafter referred to as "velocity 25") represents steering angular velocity signal 19 after a change in the steering angle came to a standstill. First value of steering angular velocity 26 (hereinafter referred to as "velocity 26") represents velocity 25 when steering angle change is at a standstill. Second value of steering angular velocity 27 (hereinafter referred to as "velocity 27") represents velocity 25 at period $T_{e1}$ after the steering angle change came to a standstill. Third value of steering angular velocity 28 (hereinafter referred to as "velocity 28") represents velocity 25 at period $T_e=T_{e1}+T_{e2}=T_{n-1} \times A+T_c \times Y$, Y being equal to unity, after steering angle change came to a standstill. Period 29 is constant extended period $T_c$ and is a period in which steering angular velocity 25 in respective periods is maintained and outputted.

In FIG. 4, as a change in the steering angle is at a standstill, no change in signal 18 can be detected by nature. Accordingly, it suffices to output 0 deg/s as velocity 25, meaning steering angular velocity is at a standstill. However, it is not possible to determine whether steering angle change has come to a complete standstill or a steering angle change is undergoing at an extremely low velocity. Accordingly, a description will be given on velocity 25 from a time at last change in signal 18 till standstill of a steering angular velocity change (0 deg/s).

Velocity 26 as computed last time a change in the steering angle was detected is outputted after computation of velocity $V_n$ only during the period extended to period $T_{e1}=T_{n-1} \times A$. As an example, assuming A=5/4, velocity 26 is outputted after time has been extended by 25%. However, as no subsequent change in the steering angle is detected, when steering angular velocity is computed as is, the steering angular velocity becomes zero. This is because the amount of change in the steering angle is zero. At this time, however, it is not possible to determine whether steering angle change has come to a complete standstill or a steering angle change is undergoing at an extremely low velocity. Accordingly, in the event no change in the steering angle is detected after last detection of a change in the steering angle and, in addition, after period $T_{e1}$ has elapsed, velocity 27 is outputted which is reduced steering angular velocity obtained by multiplying earlier-mentioned velocity 26 by velocity coefficient B and dropping a decimal. For example, by using a velocity coefficient of B=3/4=0.75, the steering angular velocity is reduced by 25%.

Furthermore, in the event no steering angle change is detected after the output time of velocity 27 has exceeded period 29, velocity 28 is outputted which is reduced steering angular velocity obtained by further multiplying velocity 27 by velocity coefficient B and dropping a decimal. Thus, when no change in the steering angle is detected, extended output period $T_e$ is extended in sequence by constant extended period $T_c$. And, velocity 25 is reduced for each period of constant extended period $T_c$ thus approaching a state of a steering angular velocity standstill (0 deg/s) with time.

Also, when a change in the steering angle is detected again during the course of gradual reduction of velocity 25 by using velocity coefficient B, as velocity 25 increases rapidly, velocity 25 is outputted in response to actual change in the steering angle.

Also, FIG. 5 is a diagram showing an example of steering angular velocity until it reaches a state of steering angular velocity standstill by using time coefficient A and velocity coefficient B.

In FIG. 5, steering angular velocity 32 (hereinafter referred to as "velocity 32") represents the behavior of a change in steering angular velocity signal 19 when the last steering angular velocity was 10 deg/s. Also, steering angular velocity 33 (hereinafter referred to as "velocity 33") represents the behavior of signal 19 when the last steering angular velocity was 5 deg/s.

Also, time coefficient A and velocity coefficient B are set in a manner selectable depending on the last steering angular velocity. For velocity 32 and 33, time coefficient A=5/4, velocity coefficient B=3/4, and constant extended period $T_c$=24 ms are applied. Also, the required time for the last change in the steering angle is 50 ms for velocity 32 and 101 ms for velocity 33.

Based on the above-mentioned conditions, velocity 32 and velocity 33 come to states of steering angular velocity standstill after elapsed time of 183 ms and 198 ms, respectively, or in nearly the same time.

By the way, time coefficient A, velocity coefficient B and constant extended period $T_c$ are not limited to the above-mentioned values. Optimum coefficients may be used at any time depending on the change of the actual steering angular velocity. Furthermore, these coefficients may be properly selected according to the characteristics of body control systems of automobiles and vessels of which a description is omitted.

Also, a decimal of detected value of steering angular velocity $V_n$ is dropped so that it becomes an integer. However, velocity $V_n$ is not limited to integers. For example, if there is a margin in the signal processing power, velocity $V_n$ may be in units of 0.1 or 0.01. The resolution for outputting velocity $V_n$ in a step-wise manner may be appropriately chosen depending on the characteristics of detector 16, operating unit 17 and body control system.

What is claimed is:

1. A steering angular velocity computing device comprising:
   a steering angle detector for detecting a change in steering angle;
   a timer for measuring a required time from a time when the steering angle changes to a time when the steering angle next changes; and
   a steering angular velocity computing unit for computing a steering angular velocity by dividing an amount of change of the steering angle by the required time corresponding to the amount of change after the detector has detected a change in the steering angle, and outputting the steering angular velocity,
   wherein the steering angular velocity computing unit outputs the steering angular velocity for a first extended output period longer than the required time when the steering angular velocity is being reduced,
   wherein the steering angular velocity computing unit computes and outputs a reduced steering angular velocity obtained by multiplying the steering angular velocity by a velocity coefficient in each interval of a constant extended period, when a next change in the steering angle is not detected during the first extended output period.

2. The steering angular velocity computing device of claim 1, wherein the first extended output period is obtained by multiplying the required time by a time coefficient.

3. The steering angular velocity computing device of claim 1, wherein the steering angle detector is provided with a magnetic steering angle sensor.

4. The steering angular velocity computing device of claim 3, wherein the steering angle detector includes:
   a rotating body;
   a magnet provided in a center of the rotating body; and
   an anisotropic magnetic resistance element disposed opposite to the magnet.

5. A steering angular velocity computing method comprising:
   detecting a change in steering angle;
   measuring a required time from a time at the steering angle changes until a time at the steering angle next changes;

computing a steering angular velocity by dividing an amount of change of the steering angle by the required time corresponding to the amount of change;

outputting the steering angular velocity during a first extended output period longer than the required time;

computing a reduced steering angular velocity in each interval of a constant extended period by multiplying the steering angular velocity by a velocity coefficient when a next change in the steering angle is not detected during the first extended output period; and outputting the reduced steering angular velocity.

* * * * *